(12) United States Patent  (10) Patent No.: US 8,532,438 B2
Yun  (45) Date of Patent: Sep. 10, 2013

(54) MATCHING IMAGES WITH SHAPE DESCRIPTORS

(75) Inventor: Il Dong Yun, Seongnam-si (KR)

(73) Assignee: Empire Technology Development LLC, Wilmington, DE (US)

( * ) Notice: Subject to any disclaimer, the term of this patent is extended or adjusted under 35 U.S.C. 154(b) by 304 days.

(21) Appl. No.: 12/303,686

(22) PCT Filed: May 9, 2008

(86) PCT No.: PCT/KR2008/002618
§ 371 (c)(1),
(2), (4) Date: Nov. 23, 2010

(87) PCT Pub. No.: WO2009/136673
PCT Pub. Date: Nov. 12, 2009

(65) Prior Publication Data
US 2011/0103691 A1    May 5, 2011

(51) Int. Cl.
*G06K 9/60*  (2006.01)
(52) U.S. Cl.
USPC ........... 382/305; 382/219; 382/278; 358/403; 707/822; 707/825
(58) Field of Classification Search
USPC ......... 382/209, 219, 278, 282, 305; 358/537, 358/538, 403; 707/822, 825
See application file for complete search history.

(56) References Cited

U.S. PATENT DOCUMENTS

| 5,748,904 | A | * | 5/1998 | Huang et al. .................. 345/544 |
| 5,761,655 | A | * | 6/1998 | Hoffman ............................... 1/1 |
| 5,793,371 | A | * | 8/1998 | Deering ........................ 345/418 |
| 5,835,244 | A | * | 11/1998 | Bestmann ...................... 358/523 |
| 5,926,647 | A | * | 7/1999 | Adams et al. .................... 712/36 |
| 6,181,818 | B1 | * | 1/2001 | Sato et al. ....................... 382/170 |
| 6,253,201 | B1 | * | 6/2001 | Abdel-Mottaleb et al. ........... 1/1 |
| 6,556,692 | B1 | | 4/2003 | Gavrila |
| 6,754,667 | B2 | | 6/2004 | Kim et al. |
| 6,803,919 | B1 | * | 10/2004 | Kim et al. ..................... 345/582 |
| 7,128,270 | B2 | * | 10/2006 | Silverbrook et al. .... 235/472.01 |
| 7,162,105 | B2 | | 1/2007 | Bober |

(Continued)

FOREIGN PATENT DOCUMENTS

| DE | 198 31 413 A 1 | 4/2000 |
| KR | 10-2000-0054864 | 9/2000 |

(Continued)

OTHER PUBLICATIONS

International Search Report mailed Jan. 28, 2009 for corresponding PCT Application No. PCT/KR2008/002618 filed May 9, 2008.

(Continued)

*Primary Examiner* — Yosef Kassa
(74) *Attorney, Agent, or Firm* — Brundidge & Stanger, P.C.

(57) ABSTRACT

An image retrieval system includes an image entry unit configured to input an image. A descriptor determining unit receives the image and transforms the image into an intermediate image to generate a descriptor of the image, for example, utilizing the distance transform (DT) application. An image comparing unit compares the image with a plurality of candidate images by comparing the descriptor of the image with descriptors of the plurality of candidate images. Finally, a retrieving unit retrieves one or more candidate images similar to the input image based on the comparison of their descriptors.

31 Claims, 9 Drawing Sheets

(56) References Cited

U.S. PATENT DOCUMENTS

| | | | |
|---|---|---|---|
| 7,295,718 B2 * | 11/2007 | Park et al. | 382/305 |
| 2002/0019819 A1 | 2/2002 | Sekiguchi et al. | |
| 2002/0063718 A1 | 5/2002 | Choi et al. | |

FOREIGN PATENT DOCUMENTS

| | | |
|---|---|---|
| KR | 10-2002-0080073 | 10/2002 |
| KR | 10-2003-0029410 | 4/2003 |
| WO | WO 98/50869 | 11/1998 |

OTHER PUBLICATIONS

International Written Opinion mailed Jan. 28, 2009 for corresponding PCT Application No. PCT/KR2008/002618 filed May 9, 2008.

Fang et al., "Face Detection Based on Multiple Regression and Recognition Support Vector Machines," *British Machine Vision Conference*, (2003), pp. 1-10.

International Preliminary Report on Patentability (IPRP) from corresponding PCT/KR2008/002618 filed May 9, 2008.

* cited by examiner

BINARY IMAGE → INTERMEDIATE IMAGE AFTER DT

BINARY IMAGE       INTERMEDIATE IMAGE AFTER DT

BINARY IMAGE

INTERMEDIATE IMAGE AFTER DT

Figure 9

| Index | Image | ART Similarity (%) | GART Similarity (%) |
|---|---|---|---|
| 1 | | 70 | 80 |
| 2 | | 75 | 75 |
| 3 | | 90 | 95 |
| 4 | | 95 | 95 |
| 5 | | 30 | 40 |
| 6 | | 95 | 95 |
| 7 | | 95 | 95 |
| 8 | | 65 | 70 |
| 9 | | 50 | 70 |
| 10 | | 100 | 100 |
| 11 | | 80 | 80 |
| 12 | | 50 | 50 |
| 13 | | 75 | 75 |

| Index | Image | ART Similarity (%) | GART Similarity (%) |
|---|---|---|---|
| 14 | | 70 | 70 |
| 15 | | 100 | 100 |
| 16 | | 100 | 100 |
| 17 | | 60 | 70 |
| 18 | | 40 | 50 |
| 19 | | 70 | 80 |
| 20 | | 70 | 70 |
| 21 | | 100 | 100 |
| 22 | | 60 | 60 |
| 23 | | 100 | 100 |
| 24 | | 30 | 35 |
| 25 | | 40 | 40 |
| 26 | | 95 | 95 |
| Total | | 73.27 | 76.54 |

MATCHING IMAGES WITH SHAPE DESCRIPTORS

RELATED APPLICATIONS

This application is the U.S. National Phase under 35 U.S.C. §371 of International Application No. PCT/KR2008/002618 entitled MATCHING IMAGES WITH SHAPE DESCRIPTORS, filed in English on May 9, 2008, designating the U.S. The content of this application is incorporated by reference in its entirety.

TECHNICAL FIELD

The present disclosure relates generally to image descriptors.

BACKGROUND

Due to the widespread use of digital cameras, image editing software, and other related technologies, devices, or both, users are having to manage and manipulate digital images. It is an important aspect of digital image devices, applications, or both to provide a user with the ability to manage, retrieve, manipulate, and use images efficiently and effectively. As a result, there are efforts to develop efficient and simple methods for retrieving images from a storage device. For example, in the field of image processing, Moving Picture Experts Group (MPEG) has been developing several types of image retrieving applications.

A typical image retrieving application may generate a descriptor of an image for indexing and retrieval of the image. An image's shape is a useful characteristic to use in describing an image. A shape may describe an image in geographical form only, without having to include other features of the image such as colors, textures, or the like. For example, MPEG adopts several descriptors including those known as the Curvature Scale Space (CSS) descriptor and the Angular Radial Transform (ART) descriptor.

The CSS descriptor extracts features of an image based on information regarding one or more contour lines of the image. On the other hand, the ART descriptor does not directly use the information about contour line(s) but instead exploits area-specific information about an image, such as an angular component and a radial component of pixel value varying with locations of the pixels in the image. The ART may thus be more generally applied to various images regardless of the number of the contour lines in the image.

The conventional ART descriptor, however, has limitations. For example, for images having relatively simple features, such as an image having one contour line, the ART descriptor may not achieve the desired level of accuracy in describing a shape of an image. This is because, in order to obtain an accurate ART descriptor, information regarding various aspects of an image need to be extracted. Further, the ART descriptor relies on a relatively complicated numerical algorithm requiring substantial computational resources. Therefore, there exist needs to enhance the accuracy of the ART descriptor so that images can be described, indexed, and retrieved in a more effective and efficient manner while also reducing the complexity of the descriptor-related algorithm.

BRIEF DESCRIPTION OF THE DRAWINGS

FIG. 9 is a chart comparatively illustrating the database search performance between the GART (Gray-level Angular Radial Transform) descriptor in accordance with one embodiment of an apparatus and method in accordance with the present disclosure and a conventional ART descriptor, as measured by Bull's Eye Performance (BEP).

SUMMARY

In one embodiment, a distance transforming (DT) unit is utilized to generate an intermediate image which provides additional features, (e.g., descriptor parameters) for an input query image. The DT unit can transform the input query image into the intermediate image having various pixel values depending on the locations of the pixels in the image. The various pixel values generated in the intermediate image are used as additional image attributes or descriptor parameters that can be utilized for a more efficient and effective generation of an image descriptor for the query image. The image descriptor generating apparatus may apply an ART descriptor generating algorithm on the intermediate image, thereby generating a descriptor of the input query image.

In another embodiment, an image retrieval system includes an image entry unit, a descriptor determining unit, an image comparing unit, and a retrieving unit. The image entry unit is configured to receive as input an image. The descriptor determining unit is adapted to receive and transform the image into an intermediate image using a DT unit to generate a descriptor of the image. An image comparing unit is configure to compare the image with one or more images stored in a database, for example, by comparing the descriptor of the query image with descriptors of the images stored in the database. Finally, a retrieving unit is configured to retrieve one or more candidate images that closely match or are similar to the input image based on the comparison of the descriptors.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

It will be readily understood that the components of the present disclosure, as generally described and illustrated in the Figures herein, could be arranged and designed in a wide variety of different configurations. Thus, the following more detailed description of the embodiments of apparatus and methods in accordance with the present disclosure, as represented in the Figures, is not intended to limit the scope of the disclosure, as claimed, but is merely representative of certain examples of presently contemplated embodiments in accordance with the disclosure. The presently described embodiments can be understood by reference to the drawings, wherein like parts are designated by like numerals throughout.

Figure 1:
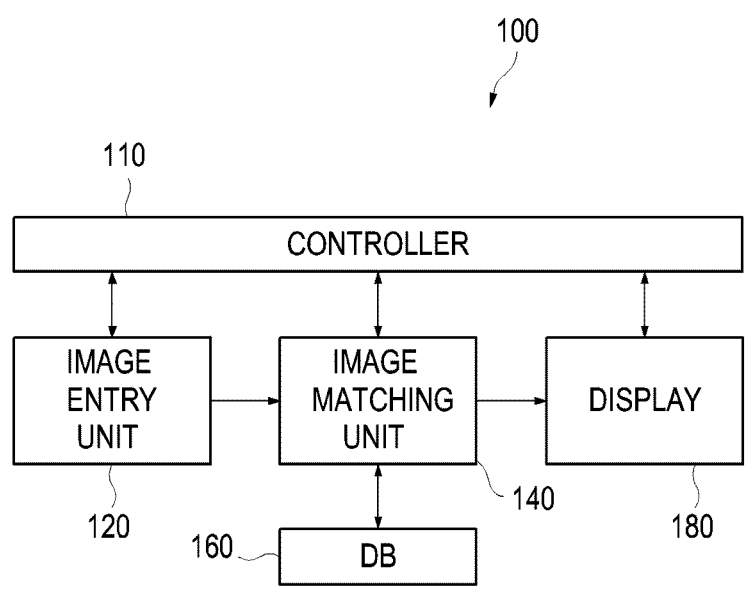
FIG. 1 shows a schematic block diagram of an image retrieval system in accordance with one embodiment.

Referring to FIG. 1, one embodiment of an image retrieval system 100 is illustrated. The image retrieval system 100 may include a controller 110, an image entry unit 120, an image matching unit 140, a database (DB; 160) as a storage device, and a display 180. Each of the components 110, 120, 140, 160, and 180 may be provided as a single unit or device, or one or more units or devices, depending on the desired implementations. For example, the image matching unit 140 and the DB 160 may be implemented in a single integrated apparatus with the image entry unit 120. Alternatively, the image matching unit 140 and the DB 160 may be implemented separately and remotely from the image entry unit 120.

In practice, a user may select an image for input to the image retrieval system 100 utilizing the image entry unit 120. The image entry unit 120 may include various types of input devices including, but not limited to, a keypad, a keyboard, a mouse, a touch pad, a touch screen, a pointing device, a trackball, a light pen, a joystick, a speech recognition device, a stylus device, an eye and head movement tracker, a digitizing tablet, a barcode reader, and the like, each of which may provide the user an interface to enter a desired query image. The image entry unit 120 may then deliver the entered image to the image matching unit 140 as configured or programmed by the controller 110.

In selected embodiments where the image matching unit 140 is installed on a remote device or server separate from the image entry unit 120, the input image may be transmitted from the image entry unit 120 to the image matching unit 140 via a wired or wireless communication protocol. For example, a communication protocol (either wired or wireless) may be implemented by employing a digital interface protocol, such as a serial port, parallel port, PS/2 port, universal serial bus (USB) link, firewire or IEEE 1394 link, or wireless interface connection, such as an infra-red interface, Blue-Tooth, ZigBee, high definition multimedia interface (HDMI), high-bandwidth digital contents protection (HDCP), wireless fidelity (Wi-Fi), or the like. Alternatively, an image may be transmitted to the image matching unit 140 through mobile communications systems such as the Global System for Mobile Communications (GSM), a Global Positioning System (GPS), Digital Mobile Multimedia (DMB), Code Division Multiple Access (CDMA), High-Speed Down Link Access (HSDPA), Wi-Bro Wireless Broadband, and the like.

The image matching unit 140 may receive an image (e.g., a query image) and determine if the received image includes a descriptor for identifying or matching the images. If the image matching unit 140 fails to detect a descriptor, the image matching unit 140 may then start the process of obtaining a descriptor for the query image by applying a descriptor-generating algorithm to the query image. The image matching unit 140 compares the descriptor of the query image with descriptors of candidate images stored in the DB 160 to select at least one matched image. The matched image is delivered to the display 180, for example, for the user's reference.

Figure 2:
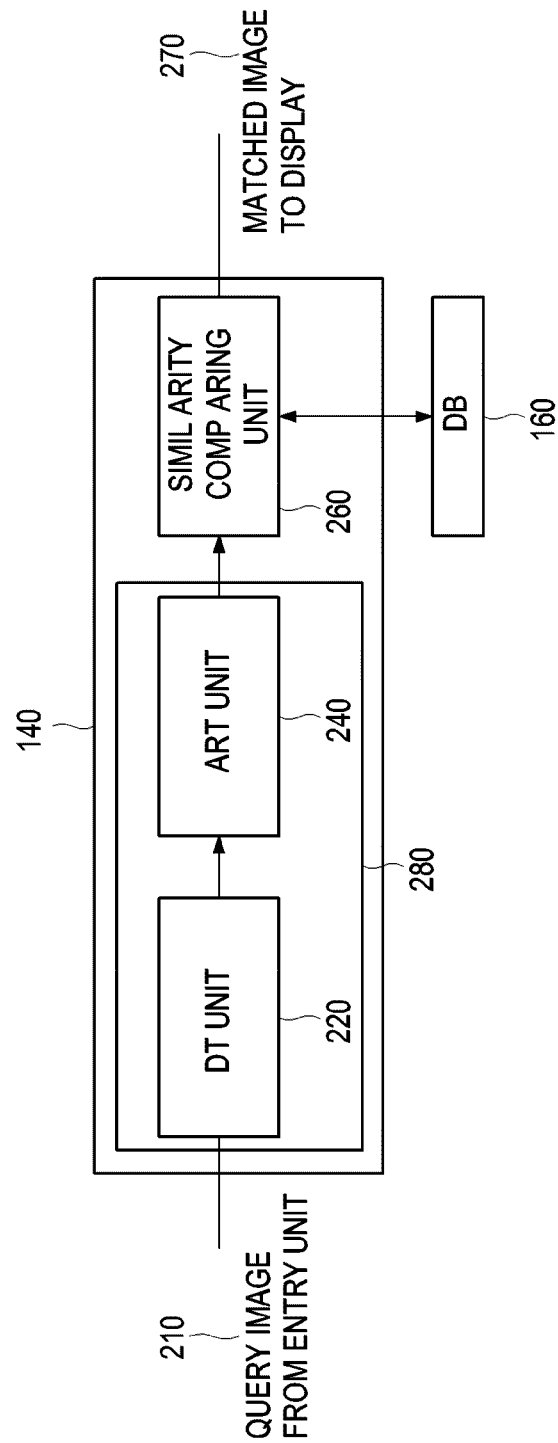
FIG. 2 is a schematic block diagram of an image matching device of an image retrieval system in accordance with one embodiment.

FIG. 2 shows one embodiment of the image matching unit 140. In some embodiments, the image matching unit 140 may include a descriptor generating unit 280 and a similarity comparing unit 260. As shown in FIG. 2, the descriptor generating unit 280 may include a distance transforming unit (DT unit) 220 and an angular radial transforming unit (ART unit) 240. The image matching unit 140 receives a query image 210 from the image entry unit 120 and performs a process to match the query image 210 to candidate images stored in the DB 160. For example, the image matching unit 140 can match the query image 210 to the candidate images by comparing a descriptor of the query image 210 with descriptors of the candidate images. The image matching unit 140 delivers the matched image 270 to the display 180.

In selected embodiments, when the descriptor generating unit 280 receives the query image 210, the DT unit 220 in the descriptor generating unit 280 transforms the query image 210 into an intermediate image and delivers the intermediate image to the ART unit 240. For example, the DT unit 220 may modify the input query image into a binary image having a shape corresponding to that of the input image and transform the binary image into an intermediate image having various pixel values depending on the locations of the pixels relative to the boundary of the binary image. The ART unit 240 may perform an ART descriptor generating algorithm to the intermediate image, thereby generating a descriptor of the input query image 210 for ultimate comparison and matching with the images stored in the database. The ART unit 240 may use the wide range of pixel values of the intermediate image as additional features or parameter to generate a descriptor for the original input image (i.e., the query image 210). The ART unit 240 delivers the descriptor and the query image 210 to the similarity comparing unit 260. The similarity comparing unit 260 may then search for and retrieve candidate images from the DB 160 that are most similar to the query image 210 by comparing the descriptor of the query image 210 with descriptors of the images stored in the DB 160. The descriptors of the candidate images may be previously stored in the DB 160 with the candidate images. Alternatively, the image matching unit 140 may select one of the candidate images randomly or using a sequence number attached to the candidate image stored in the DB 160. The image matching unit 140 applies the same processes as used to generate a descriptor of the query image 210 to generate a descriptor of the candidate image. In this way, the image matching unit 140 may obtain the descriptor for the candidate image at the time (or about the same time) the query image is compared to the candidate image. In either case, the similarity comparing unit 260 may retrieve candidate images that most closely match or resemble the query image 210 upon comparing the descriptors of the query image 210 and the candidate images.

After the similarity comparing unit 260 compares the image descriptor of the query image 210 and all or some of the image descriptors stored in the DB 160, the similarity comparing unit 260 retrieves at least one image (i.e., a matched image 270) that is most similar to the query image 210 from the DB 160 and outputs the retrieved image or images to the display 180. As an example, the similarity comparing unit 260 may determine a distance between the descriptor of the input query image 210 and descriptors of the candidate images to determine the matched image 270 having a shortest distance. The similarity comparing unit 260 may store the input query image 210 in the DB 160 with the descriptor for describing the input image 210. The similarity comparing unit 260 delivers the matched image to the display 180.

In some embodiments, the descriptor generating unit 280 may initially receive the query image 210 from the image entry unit 120 through various methods including direct connections or communication protocols. The DT unit 220 in the descriptor generating unit 280 may then transform the query image 210 into an intermediate image to provide the original query image 210 with more parameters or features in addition to those directly extracted from its one or more boundary or contour lines. For example, the descriptor generating unit 280 transforms the query image 210 into a binary image. The DT unit 210 may transform the binary image into an intermediate image having a gray-scale. In other words, the DT unit 210 transforms the original query image 210 to have boundaries that change gradually depending on the distance from contour lines of the binary image. The DT unit 220 may transform the input query image 210 into the intermediate image having gray pixel values (from pure white to pure black) depending on the locations of the pixels (or based on the distances of the pixels from the outer boundaries or contour lines). In this way, the DT unit 220 may provide additional parameters or features to those of the query image 210 to generate the intermediate image, such as, for example the gray-scale image. Although the intermediate image is described as a gray scale image for the convenience of explanation, the intermediate image may include any transformed images having additional features to the query image 210, such as an image having gradually changing boundaries, a color added image, and a luminance added image, as long as such features (e.g., a gray scale, color, luminance and the like) vary with the locations of the pixels in the image. For example, different shades, intensities, or strengths of color may be assigned to each pixel value depending on the distance from the boundary of the image.

Once the intermediate image is created as described above, it is delivered to the ART unit 240, which performs an algorithm on the intermediate image, thereby generating an ART descriptor for the intermediate image. Such an ART descriptor may be referred to as a GART (Gray-level Angular Radial Transform) descriptor for describing the query image 210. The GART descriptor and the original query image 210 are forwarded to the similarity comparing unit 260. The similarity comparing unit 260 compares the GART descriptor of the query image 210 with descriptor(s) of the candidate image(s) stored in the DB 160. The similarity comparing unit 260 may thus determine one or more candidate images stored in the DB 160 that may best (or most closely) match the query image 210. For example, the similarity comparing unit 260 may determine the distance between the descriptor of the query image 210 and descriptors of the candidate images to determine the matched image 270 having a shortest distance of difference therein. The similarity comparing unit 260 delivers to the display 180 the matched image 270 (i.e., the one or more candidate images determined to be most similar or relatively close to the query image 210) through various methods including direct connections or communication protocols as programmed or configured by the controller 110.

In selected embodiments where the display 180 is installed in a remote device separate from the image matching unit 140, the matched image or several best candidate images may be transmitted to the display 180 by way of a wired or wireless communication protocol. In alternative embodiments, the image entry unit 120 and the display 180 may be implemented in a single device having communication capability, such as a cellular phone, PDA, wireless terminal, or the like.

Figure 3:
FIG. 3 is a schematic diagram illustrating the application of a distance transform (DT) in accordance with one embodiment.

Referring to FIG. 3, the concept or application of a distance transform (DT) utilized by the DT unit 220 is illustrated. FIG. 3 shows a binary image of the input query image 210 (on the left) and an intermediate image after the DT application is performed (on the right). As shown in FIG. 3, the query image 210 may be represented in a binary form where the boundary pixels of a shape in the query image 210 are indicated with "0" pixel value and the rest of the pixels are indicated with "1" pixel value. In selected embodiments, the DT unit 220 may transform a binary form of the query image 210 into a gray-level image (i.e., the intermediate image) in such a way that each pixel in the binary query image 210 has a value corresponding to the distance between a boundary of the binary image and that pixel. The DT unit 220 may output a gray scale image as shown on the right side of FIG. 3. The gray scale image has its pixel values corresponding to the distance from the boundary of the shape in the image so that the pixel located nearest the center of the shape has the largest pixel value (in this case "3"). In this way, the original binary query image may be transformed into the gray scale image having modified pixel values depending on the distance thereof from the boundary.

Figure 4:
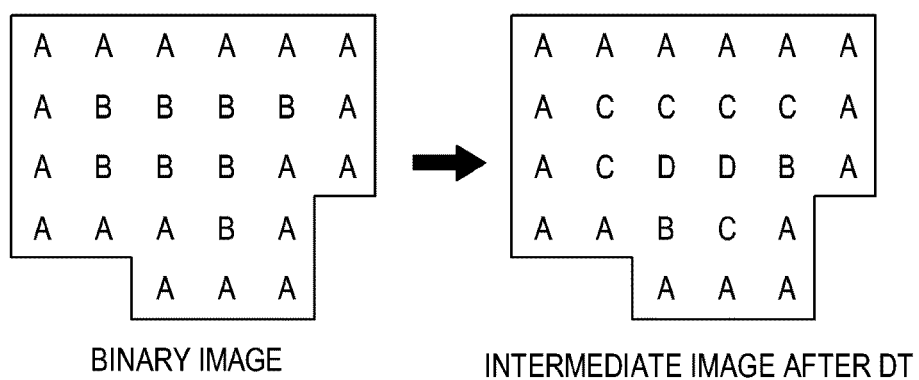
FIG. 4 is a schematic diagram illustrating the application of a distance transform for converting a binary image to an intermediate image in accordance with one embodiment.

FIG. 4 shows another example of illustrating the application of a distance transform (DT) to convert a binary image into an intermediate image (e.g., a gray scale image). The binary image shown on the left has a first pixel value of "A" at pixels along a boundary of the image and a second pixel value of "B" at the rest of pixels. The DT unit 220 may transform each of the pixel values depending on a distance between the boundary and each position of the corresponding pixel so the intermediate image after the DT (on the right) has a first pixel value of "A" at the pixels directly adjacent to the boundary and various other pixel values for the rest of the pixels not directly neighboring the boundary. For example, the binary image may be transformed into the intermediate image to have pixel values varying with the positions of the pixels so that the pixels in the DT-applied image have the second value "B" at the pixels diagonally adjacent to the boundary (having only their vertices adjacent to the boundary), a third pixel value "C" at pixel positions directly adjacent to the pixels having the values "A," and a fourth pixel value "D" at pixel positions directly adjacent to the pixels having the values "C." In this way, the DT-applied image (the intermediate image) may have additional pixel values ranging from "A" to "D" and the various pixel values may indicate the positions of the pixels so that geometrical components of the image, e.g., an angular and a radial component of the pixels, may have higher resolutions to thereby describe the image more accurately.

Figure 5:
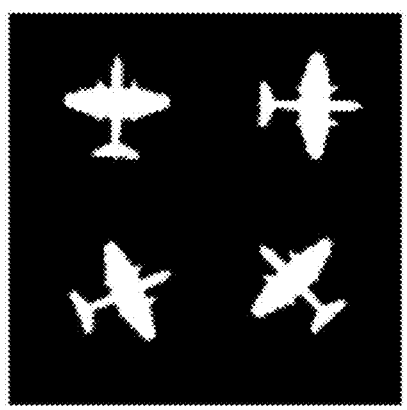
FIG. 5 shows exemplary images illustrating the results of the DT in accordance with one embodiment.
Figure 5:
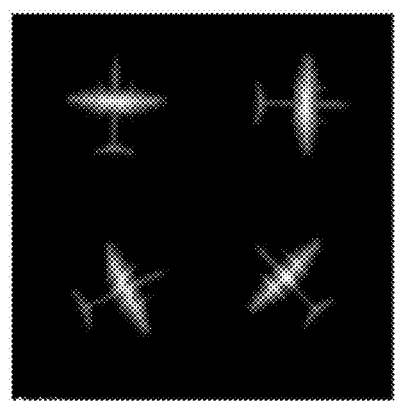

Referring to FIG. 5, the results of applying the DT are illustrated according to one embodiment of the present disclosure. FIG. 5 shows images having shapes before (left) and after (right) applying the DT to each of the shapes in the binary query image. As shown in FIG. 5, the DT-applied image (the intermediate image shown on the right side) has a smooth gradation of the boundaries of the shapes in the image, which may provide additional geometrical components to the query image. In this way, the intermediate image may have a wider range of pixel values than the query image or various kinds. Such a wide range of pixel values may provide additional parameters or attributes for more accurately describing the query image. Thus, the DT-applied image may have additional levels of parameters or attributes at each pixel value so an ART descriptor obtained from the DT-applied image may describe the original image more accurately. In some embodiments, the shapes of the image on the left are represented with black and white colors, and information that could be extracted from the pixels of the image may indicate where the boundaries of the shapes exist, based on the color change between black and white. From the DT-applied image on the right side of FIG. 5, the boundaries of the image are graded thereby providing additional information about the image, such as a contour line, a medial axis, a skeleton, or the like. For example, since the DT-applied image has larger pixel values as the positions of the pixels become more distant from the boundaries of the query image, the pixel having the largest values may correspond to the medial axis of the image. In this way, the descriptor generating unit 280 may characterize the image more precisely, so the image retrieval system 100 may retrieve the image more accurately by using the more accurate descriptor.

In certain embodiments, the ART unit 240 performs an algorithm for producing an ART descriptor for the DT-applied image, thereby obtaining a GART descriptor for the query image 210. For example, the ART unit 240 may represent the gray scale image as f($\rho$, $\theta$) by using a polar coordinate ($\rho$, $\theta$). By using ART basis functions $V_{nm}$($\rho$, $\theta$), feature coefficients $F_{nm}$ of the gray scale image can be represented in a polar coordinate system as defined by:

$$F_{nm} = \langle V_{nm}(\rho, \theta), f(\rho, \theta) \rangle = \int_0^{2\pi} \int_0^1 V_{nm}^*(\rho, \theta), \quad \text{[Equation 1]}$$
$$f(\rho, \theta)\rho \, d\rho \, d\theta$$

where the ART basis functions $V_{nm}$($\rho$, $\theta$) may be calculated as below;

$$V_{nm}(\rho,\theta) = A_m(\theta) R_n(\rho),$$

and each element of the ART basis functions $V_{nm}$($\rho$, $\theta$) is calculated or defined by $$A_m(\theta) = \frac{1}{2\pi}\exp(\theta), \quad R_n(\rho) = \begin{cases} 1 & n=0 \\ 2\cos(\pi n \rho) & n \neq 0 \end{cases}$$

wherein n indicates one level of angles, and m indicates one level of radii.

Figure 6:
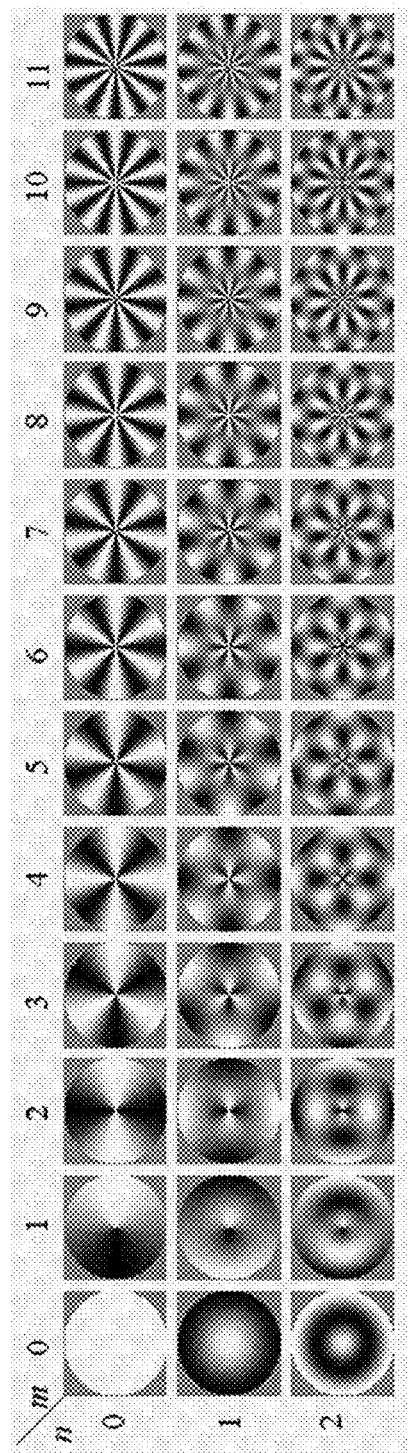
FIG. 6 shows examples of basis functions of the ART used in one embodiment.

For example, in a case where n=0, 1, 2; and m=0, 1, ..., 11, the total of 36 basis functions can be produced, as shown by FIG. 6. By using the basis functions, the amplitudes a of the feature coefficients obtained in the above equation (1) for m and n (n=0, 1, 2; and m=0, 1, ..., 11), are collected to form the GART descriptor for the j-$^{th}$ image, as below:

$$A_j = [\alpha_j^1 \alpha_j^2 \ldots \alpha_j^{35} \alpha_j^{36}], \quad \text{[Equation 2]}$$

where j is a descriptor index indicating the j-th image. Although the 36 basis functions are used to describe the ART operations, it will be apparent to a person skilled in the art that another number of basis functions could be used without being limited to a specific number.

Referring back to FIG. 2, the ART unit 240 delivers to the similarity comparing unit 260 a GART descriptor for the query image 210. In selected embodiments, the similarity comparing unit 260 may compare the query image with candidate images by measuring the "distance" between the query image and candidate images. In order to measure the distance, the similarity comparing unit 260 actually calculates the distance by using GART descriptors of the images. For example, the distance can be calculated by using the sum of differences between the coefficients having the same index (m, n), as given by:

$$d(A_1, A_2) = \sum_{i=1}^{36} |a_1^i - a_2^i| \quad \text{[Equation 3]}$$

for the two GART descriptors of the query image and one of the candidate images, as can be represented in a vector form $A_1 = [\alpha_1^1 \alpha_1^2 \ldots \alpha_1^{35} \alpha_1^{36}]$ and $A_2 = [\alpha_2^1 \alpha_2^2 \ldots \alpha_2^{35} \alpha_2^{36}]$, respectively. The similarity comparing unit 260 may chose the candidate image that has the smallest distance (e.g., length of distance vector) from the query image as the matched image. Alternatively, the similarity comparing unit 260 may select the candidate images having distances less than a threshold distance and determine all or some of the selected images as the matched image(s). The similarity comparing unit 260 may transmit any matched images to the display 270 to allow the user to see them.

Figure 7:
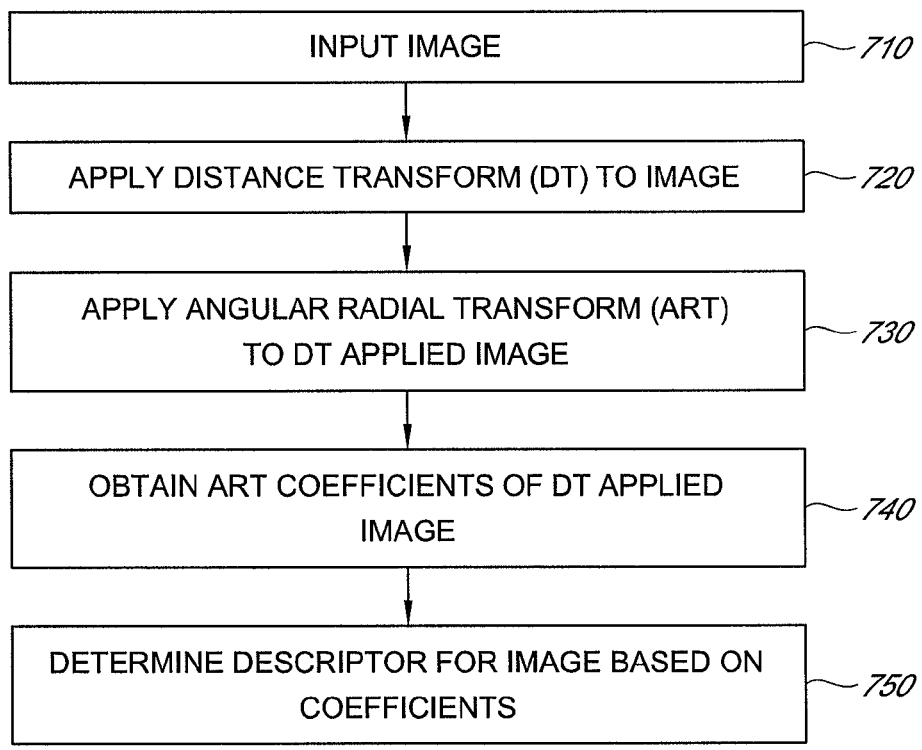
FIG. 7 is a flow chart illustrating a method for generating a descriptor in accordance with one embodiment.

Referring to FIG. 7 and with reference to FIG. 1, a method for generating a GART descriptor of an image is illustrated according to one embodiment of the present disclosure. At step 710, a user may initially input an image to the image retrieval system 100 by using the image entry unit 120. The user may use various input devices, such as a keypad, keyboard, mouse, or the like, to enter the desired image into the image retrieval system 100. Optionally, the user may transmit the desired image to a remote system to retrieve one or more images stored in a database of the remote system. In such a case, the desired image may be entered into a portable device, such as a cellular phone, PDA, or the like, and then transmitted to the image retrieval system 200 using a wireless or wired communication protocol.

The image entry unit 120 may transmit the query image 210 to the image matching unit 140. At step 720, the DT unit 220 (which may be implemented in the image matching unit 140) may perform a distance transformation (DT) on the query image 210 to create an intermediate image. For example, when the query image is a binary image, the DT unit 210 may transform the binary image into a gray-scale image. The DT unit 220 may employ any suitable method for performing the DT by using hardware, software implementations, or a combination thereof. At step 730, the ART unit 240 receives the DT-applied image and performs an ART descriptor generating algorithm on the DT-applied image (e.g., the gray-scale image).

At step 740, the ART unit 240 may obtain the ART descriptor of the DT-applied image, thereby obtaining a GART descriptor for the query image. In selected embodiments, the ART unit 240 may represent the DT-applied image by using a polar coordinate system. The ART unit 240 may perform numerical operations on the polar coordinate representation of the DT-applied image. For example, the ART unit 240 may multiply the polar coordinate representation of the DT-applied image with one of the basis functions to obtain the multiplied function and then integrate the multiplied function to calculate the one of the GART coefficients, as given by Equation (1) above. Such an operation is performed for each of different basis functions to obtain one or more GART coefficients. In operation 750, the ART unit 240 determines a descriptor for the query image 210 based on the coefficients. In other words, the ART unit 240 may collect the GART coefficients to form a vector form of the GART descriptor for the query image 210, as given by Equation (2) above.

Figure 8:
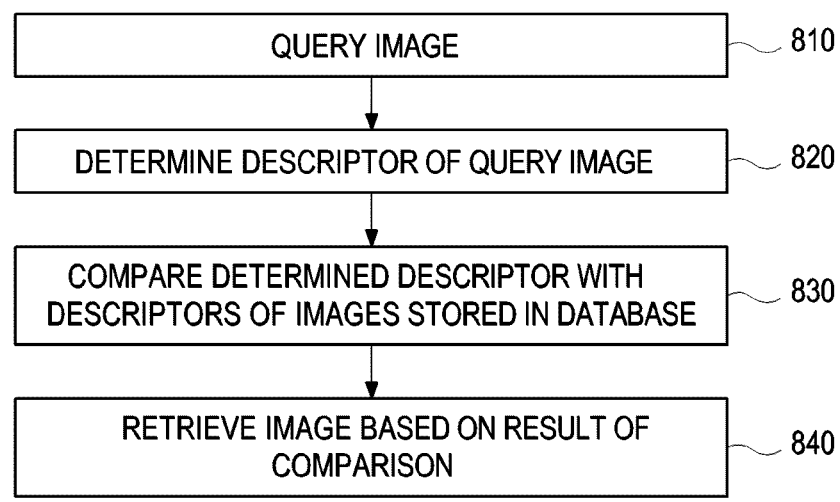
FIG. 8 is a flow chart illustrating a method for retrieving an image using a descriptor in accordance with one embodiment.

Referring to FIG. 8, a method for retrieving an image using a GART descriptor is illustrated according to one embodiment of the present disclosure. Initially, at step 810, a user may enter a query image 210 to the image entry unit 120 of the image retrieval system 100. The image entry unit 120 transmits the query image to the image matching unit 140 through various means including, for example, direct connection or communication protocols. At step 820, the descriptor generating unit 280 in the image matching unit 140 determines a descriptor of the query image 210. The DT unit 220 performs the DT transform of the query image 210 to generate an intermediate image. For example, when the query image is a binary image, the DT unit 210 may transform the binary image into a gray-scale image (e.g., as shown in FIG. 5). The ART unit 240 performs the ART descriptor-generating algorithm with the gray scale image to generate a GART descriptor for the query image 210.

At step 830, the similarity comparing unit 260 may then compare the GART descriptor of the query image 210 to the descriptors of candidate images stored in the DB 160. Such an operation may be accomplished by measuring the distance between the GART descriptor of the query image 210 and the GART descriptors of candidate images. For example, to measure this distance, the similarity comparing unit 260 calculates the Euclidian distance between the vector representations of the two GART descriptors, as represented in Equation (3) above. This process may continue until the similarity comparing unit 260 finds the closest match among the candidate images (i.e., an image that creates a sufficiently small distance). At step 840, the user may then retrieve the most closely matched image 270 based on the results provided in the operation 830. This image may be delivered to a display 180 of the image retrieval system 100 to allow a user to visually identify the image 270 and take further subsequent actions.

In certain embodiments, the display 180 may be implemented in a portable device (e.g., a cellular phone or a PDA). In such embodiments, the image matching unit 140 may transmit the matched image 270 to a portable device such as a personal computer, laptop computer, or cellular phone over a communication protocol such as BlueTooth, ZigBee, GSM, CDMA, or the like. In order to evaluate the database search performance of the GART descriptor, a database search test was conducted using a database currently used by MPEG-7. The database used includes 1,300 images categorized in a 4-layer, hierarchical structure that includes 8 top categories and 102 lower or "leaf" categories. Bull's Eye Performance (BEP) used by MPEG-7 was applied as a performance evaluation measurement. A higher BEP score means a more effective performance.

FIG. 9 compares the search performance between the GART descriptor in one embodiment and a conventional ART descriptor for 26 images. As is apparent from FIG. 8, the performance of the GART descriptor as measured by the BEP is superior to the conventional ART descriptor (by about 3% of similarity in this particular example).

In light of the present disclosure, those skilled in the art will appreciate that the systems, apparatus, and methods described herein may be implemented in hardware, software, firmware, middleware, or combinations thereof and utilized in systems, subsystems, components, or sub-components thereof. For example, a method implemented in software may include computer code to perform the operations of the method. This computer code may be stored in a machine-readable medium, such as a processor-readable medium or a computer program product, or transmitted as a computer data signal embodied in a carrier wave, or a signal modulated by a carrier, over a transmission medium or communication link. The machine-readable medium or processor-readable medium may include any medium capable of storing or transferring information in a form readable and executable by a machine (e.g., by a processor, a computer, etc.).

The present disclosure may be embodied in other specific forms without departing from its basic features or essential characteristics. Thus, the described embodiments are to be considered in all respects only as illustrative, and not restrictive. The scope of the disclosure is, therefore, indicated by the appended claims, rather than by the foregoing description. All changes within the meaning and range of equivalency of the claims are to be embraced within their scope.

The invention claimed is:

1. An image retrieval system comprising:
   an image entry unit configured to receive as input an image, the image entry unit being configured to transform the image into a binary image;
   a descriptor determining unit comprising:
      a first transforming unit configured to transform the binary image into an intermediate image, wherein the intermediate image is a grayscale image, and
      a second transforming unit configured to generate a descriptor of the image from the intermediate image;
   an image comparing unit configured to compare the image with one or more candidate images by comparing the descriptor of the image with descriptors of the one or more candidate images; and
   a retrieving unit configured to retrieve at least one of the one or more candidate images similar to the image based on the comparison of their descriptors.

2. The image retrieval system of claim 1, further comprising a display configured to display the at least one of the one or more candidate images similar to the image.

3. The image retrieval system of claim 1, further comprising a database configured to store the one or more candidate images.

4. The image retrieval system of claim 1, wherein the image comparing unit is further configured to measure a distance between the descriptor of the image and the descriptors of the candidate images to compare the image with the one or more candidate images.

5. The image retrieval system of claim 4, wherein the retrieving unit is configured to retrieve at least one of the one or more candidate images having the shortest distance to the image.

6. The image retrieval system of claim 1, wherein the first transforming unit is configured to perform a distance transformation (DT) on the image.

7. The image retrieval system of claim 6, wherein the first transforming unit is further configured to generate additional features of the image.

8. The image retrieval system of claim 7, wherein the additional features of the image include at least one of a contour line, a medial axis, and a skeleton of a shape of the image.

9. The image retrieval system of claim 1, wherein the second transforming unit is configured to perform an angular radial transform (ART) on the image processed by the first transforming unit.

10. An apparatus for generating a descriptor associated with an image, the apparatus comprising:
    an input unit configured to input an image and to transform the input image into a binary image;
    a first transforming unit configured to transform the binary image into an intermediate image; and
    a second transforming unit configured to operate on the intermediate image to generate a descriptor for the image.

11. The apparatus of claim 10, wherein the intermediate image is a gray-scale image.

12. The apparatus of claim 10, wherein the first transforming unit is further configured to perform a distance transformation (DT) on the image.

13. The apparatus of claim 12, wherein the first transforming unit is further configured to generate additional features of the image.

14. The apparatus of claim 13, wherein the additional features of the image include at least one of a contour line, a medial axis, and a skeleton of a shape of the image.

15. The apparatus of claim 10, wherein the second transforming unit is further configured to perform an angular radial transform (ART) on the image processed by the first transforming unit.

16. The apparatus of claim 10, wherein the second transforming unit is further configured to transform the intermediate image into one or more coefficients representative of features of the intermediate image.

17. The apparatus of claim 16, wherein the second transforming unit is further configured to collect the one or more coefficients to generate the descriptor for the image.

18. The apparatus of claim 10, wherein the apparatus is a portable device.

19. An image matching apparatus, comprising:
a transforming unit configured to transform an image from a binary image into a grayscale intermediate image;
a descriptor generating unit configured to generate a descriptor of the image from the grayscale intermediate image; and
a matching unit configured to compare the descriptor of the image to a descriptor of one or more candidate images.

20. The image matching apparatus of claim 19, further comprising a storage device configured to store the one or more candidate images.

21. The image matching apparatus of claim 19, wherein the matching unit is further configured to measure a distance between the descriptor of the image and the descriptor of the one or more candidate images.

22. The apparatus of claim 19, wherein the transforming unit is further configured to perform a distance transformation (DT) on the binary image to generate the grayscale intermediate image.

23. The apparatus of claim 19, wherein the descriptor generating unit is further configured to perform an angular radial transform (ART) on the grayscale intermediate image processed by the transforming unit.

24. A method for generating a descriptor of an image, the method comprising:
receiving as input an image;
transforming the image into a binary image;
transforming the binary image into an intermediate grayscale image; and
generating a descriptor of the image based on the intermediate grayscale image.

25. The method of claim 24, wherein the transforming the image includes performing a distance transformation (DT) on the image.

26. The method of claim 24, wherein the generating the descriptor includes performing an angular radial transform (ART).

27. An image retrieving method comprising:
receiving an image;
transforming the image into a binary image;
transforming the binary image into a grayscale intermediate image;
generating a descriptor for the image based on features of the grayscale intermediate image;
comparing the image with one or more candidate images by comparing the descriptor of the image with descriptors of the candidate images; and
retrieving at least one of the one or more candidate images similar to the image, based on the comparison of the descriptors.

28. The image retrieving method of claim 27, wherein the comparing the image includes measuring a distance between the descriptor of the image and the descriptors of the candidate images to compare the image with the one or more candidate images.

29. The image retrieving method of claim 28, wherein the retrieving the at least of the one or more candidate images includes retrieving at least one of the one or more candidate images having the shortest distance to the image.

30. A non-transitory computer-readable medium storing instructions that, when executed by a computer, cause the computer to perform a method for generating a descriptor of an image, the method comprising:
transforming a received image into a binary image
transforming the binary image into a grayscale intermediate image; and
generating a descriptor of the received image based on the grayscale intermediate image.

31. A non-transitory computer-readable medium storing instructions that, when executed by a computer, cause the computer to perform a method for retrieving an image, the method comprising:
transforming a received image into a binary image;
transforming the binary image into an intermediate image;
generating a descriptor for the image based on features of the intermediate image;
comparing the received image with a plurality of candidate images by comparing the descriptor of the image with descriptors of the candidate images; and
retrieving one or more candidate image that is similar to the received image based on the comparison of the descriptors.

* * * * *

UNITED STATES PATENT AND TRADEMARK OFFICE
CERTIFICATE OF CORRECTION

PATENT NO. : 8,532,438 B2
APPLICATION NO. : 12/303686
DATED : September 10, 2013
INVENTOR(S) : Yun It is certified that error appears in the above-identified patent and that said Letters Patent is hereby corrected as shown below:

In the Specification:

In Column 3, Line 49, delete "Digital Mobile Multimedia" and insert -- Digital Multimedia Broadcasting --, therefor.

In Column 3, Line 51, delete "Access" and insert -- Packet Access --, therefor.

In Column 5, Line 4, delete "unit 210" and insert -- unit 220 --, therefor.

In Column 5, Line 5, delete "DT unit 210" and insert -- DT unit 220 --, therefor.

In Column 7, Line 20, delete "below;" and insert -- below: --, therefor.

In Column 7, Line 35, delete "amplitudes a" and insert -- amplitudes $a^i$ --, therefor.

In Column 7, Line 59, in [Equation 3], delete " $d(A_1, A_2) = \sum_{i=1}^{36} |a_1^i - a_2^i|$ " and insert -- $d(A_1, A_2) = \sum_{i=1}^{36} |\alpha_1^i - \alpha_2^i|$ --, therefor.

In Column 8, Lines 28-29, delete "DT unit 210" and insert -- DT unit 220 --, therefor.

In Column 8, Line 66, delete "DT unit 210" and insert -- DT unit 220 --, therefor.

In the Claims:

In Column 12, Line 22, in Claim 29, delete "at least" and insert -- at least one --, therefor.

In Column 12, Line 29, in Claim 30, delete "image" and insert -- image; --, therefor.

Signed and Sealed this
Twenty-seventh Day of May, 2014

Michelle K. Lee
*Deputy Director of the United States Patent and Trademark Office*